(12) United States Patent
Guillou et al.

(10) Patent No.: US 8,320,674 B2
(45) Date of Patent: Nov. 27, 2012

(54) TEXT LOCALIZATION FOR IMAGE AND VIDEO OCR

(75) Inventors: Jean-Pierre Guillou, La Jolla, CA (US); Yang Yu, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 946 days.

(21) Appl. No.: 12/380,394

(22) Filed: Feb. 26, 2009

(65) Prior Publication Data

US 2010/0054585 A1  Mar. 4, 2010

Related U.S. Application Data

(60) Provisional application No. 61/190,992, filed on Sep. 3, 2008.

(51) Int. Cl.
*G06K 9/34* (2006.01)
(52) U.S. Cl. .................. 382/179; 382/164; 382/321
(58) Field of Classification Search .................. 382/173, 382/176, 177, 179–180, 190, 199, 292, 309; 715/210
See application file for complete search history.

(56) References Cited

U.S. PATENT DOCUMENTS

| | | | |
|---|---|---|---|
| 5,262,860 A | 11/1993 | Fitzpatrick et al. | |
| 5,513,277 A | 4/1996 | Huttenlocher | |
| 5,809,161 A | 9/1998 | Auty et al. | |
| 6,100,941 A | 8/2000 | Dimitrova et al. | |
| 6,101,274 A | 8/2000 | Pizano et al. | |
| 6,204,842 B1 | 3/2001 | Fujii | |
| 6,219,453 B1 | 4/2001 | Goldberg | |
| 6,249,283 B1 | 6/2001 | Ur | |
| 6,400,996 B1 | 6/2002 | Hoffberg et al. | |
| 6,587,586 B1 | 7/2003 | Cui et al. | |
| 6,614,930 B1 | 9/2003 | Agnihotri et al. | |
| 6,658,662 B1 | 12/2003 | Nielsen | |
| 7,088,873 B2 | 8/2006 | Anisimovich et al. | |
| 7,139,033 B2 | 11/2006 | Sun | |
| 7,340,096 B2 | 3/2008 | Stauder et al. | |
| 7,570,816 B2 | 8/2009 | Bargeron et al. | |
| 2002/0083464 A1 | 6/2002 | Tomsen et al. | |
| 2004/0015517 A1 | 1/2004 | Park et al. | |
| 2004/0117405 A1 | 6/2004 | Short et al. | |
| 2004/0177063 A1 | 9/2004 | Weber et al. | |

(Continued)

FOREIGN PATENT DOCUMENTS

EP  0 720 114 A2  11/1995

(Continued)

OTHER PUBLICATIONS

"Detection of Text Captions in Compressed Domain Video," Yi Zhang et al., School of Computing, National University of Singapore, date unknown.

(Continued)

*Primary Examiner* — Duy M Dang
(74) *Attorney, Agent, or Firm* — Miller Patent Services; Jerry A. Miller

(57) ABSTRACT

In accord with embodiments consistent with the present invention, a first action in recognizing text from image and video is to locate accurately the position of the text in image and video. After that, the located and possibly low resolution text can be extracted, enhanced and binarized. Finally existing OCR technology can be applied to the binarized text for recognition. This abstract is not to be considered limiting, since other embodiments may deviate from the features described in this abstract.

18 Claims, 7 Drawing Sheets

U.S. PATENT DOCUMENTS

| | | |
|---|---|---|
| 2004/0190854 A1 | 9/2004 | Dunn et al. |
| 2005/0201619 A1 | 9/2005 | Sun et al. |
| 2005/0246747 A1 | 11/2005 | Braun et al. |
| 2006/0008260 A1 | 1/2006 | Chen et al. |
| 2006/0047704 A1 | 3/2006 | Gopalakrishnan |
| 2006/0053470 A1 | 3/2006 | Colter et al. |
| 2006/0090189 A1 | 4/2006 | Gruber |
| 2006/0117374 A1 | 6/2006 | Kortum et al. |
| 2006/0179453 A1 | 8/2006 | Kadie et al. |
| 2006/0242259 A1 | 10/2006 | Vallabh et al. |
| 2006/0271594 A1 | 11/2006 | Haberman |
| 2007/0005653 A1 | 1/2007 | Marsh |
| 2007/0028282 A1 | 2/2007 | Kooijmans et al. |
| 2007/0028284 A1 | 2/2007 | Lee |
| 2007/0127815 A1 | 6/2007 | Karidi et al. |
| 2007/0211942 A1 | 9/2007 | Curtis et al. |
| 2008/0074548 A1 | 3/2008 | Nagata et al. |
| 2008/0091713 A1 | 4/2008 | Candelore et al. |
| 2008/0122978 A1 | 5/2008 | Yen et al. |

FOREIGN PATENT DOCUMENTS

| | | |
|---|---|---|
| EP | 1 074 926 A2 | 8/2000 |
| WO | WO 01/28240 A1 | 4/2001 |
| WO | WO 01/37465 | 5/2001 |
| WO | WO 01/72040 A2 | 9/2001 |
| WO | WO 02/25575 A2 | 3/2002 |
| WO | WO 03/051031 A2 | 6/2003 |

OTHER PUBLICATIONS

English Translation, Abstract only, Patent Abstracts of Japan, Publication No. 2005056228 A, Mar. 3, 2005.
"An Efficient Method for Text Dectection in Video Based on Stroke Width Similarity," Viet Cuong Dinh et al., Computer Vision—ACCV 2007, cited from p. 200-209, Nov. 2007.
"A Robust Text Segmentation Approach in Complex Background Based on Multiple Constraints," Libo Fu et al., Advances in Multimedia Information Processing—PCM 2005, cited from p. 594-605, Oct. 2005.
"Text Detection in Natural Scene Images with Feature Combination," Q. Ye, et al., A Scientific and Technical Publishing Company, 2008.
"Video OCR: A survey and practitioner's guide," Rainer Lienhart, In Video Mining, Kluwer Academic Publisher, pp. 155-184, Oct. 2003.
"Text Information extraction in images and video: a survey," Keechul Jung et al. Pattern Recognition 37 (2004), p. 977-997.
"Camera-based analysis of text and documents: a survey," Jian Liang, et al., IJDAR, vol. 7, No. 2-3, 2005.
"Automatic text location in images and video frames," Anil K. Jain and Bin Yu, Pattern Recognition, vol. 31, No. 12, 1998.
"Recognizing characters in scene images," Shio J. Ohya and S. Akamatsu, IEEE Trans. On Pattern Analysis and Machine Intelligence, vol. 16, No. 2, 1994, pp. 214-220.
"Automatic extraction of characters in complex images," C.M. Lee, A. Kankanhalli, Int. J. Pattern Recognition Artif. Intel'. 9(1), 1995, pp. 67-82.
"Video skimming for quick browsing based on audio and image characterization," M.A. Smith, T. Kanade, Technical Report CMU-CS-95-186, Carnegie Mellon University, Jul. 1995.
"Text enhancement with asymmetric filter for video OCR." D. Chen, K. Shearer and H. Bourlard, Proceedings of International Conference on Image Analysis and Processing, Palermo, Italy, 2001, pp. 192-197.
"Automatic text detection and tracking in digital video," H. Li, D. Doermann, O. Kia, IEEE Trans. Image Process. 9(1), 2001, pp. 147-156.
"Text identification in complex background using SVM," D. Chen, H. Boulard, J-P. Thiran, Proceedings of IEEE Conference on Computer Vision and Pattern Recognition, vol. 2, 2001, pp. 621-626.
"Detecting and reading text in natural scenes," Xiangrong Che, Alan L. Yuille, Proceedings of IEEE Conference on Computer Vision and Pattern Recognition, vol. 2, 2004, pp. 366-373.
"A new robust algorithm for video text extraction," Edward K. Wong and Minya Chen, Pattern Recognition. No. 36, 2003, pp. 1398-1406.
"Character-stroke detection for text-localization and extraction," K. Subramanian, et al., Proceedings of IEEE Document Analysis and Recognition. Vo. 1, 2007, pp. 23-26.
"Statistical Region Merging," Richard Nock and Frank Nielsen, IEEE Trans. On Pattern Analysis and Machine Intelligence, vol. 26, No. 11, 2004, pp. 1452-1458.
"Statistical learning theory", V. Vapnik, John Wiley and Sons, 1998.
"LIBSVM : a library for support vector machines," Chih-Chung Chang and Chih-Jen Lin, 2001.
"An Introduction to Digital Image Processing," W. Niblack, pp. 115-116, Prentice Hall, 1986.
"A threshold selection method from gray-level histograms." N. Otsu, IEEE Trans. On Systems, Man and Cybernetics, vol. 9, No. 1, pp. 62-66, 1979.
"A new method for image segmentation," S.D. Yanowitz and A.M. Bruckstein, Computer Vision, Graphics and Image Prcoessing CVGIP, vol. 46, No. 1, pp. 82-95, 1989.
"ICDAR 2003 robust reading competitions," S.M. Lucas, et al., In 7th International Conference on Document Analysis and Recognition-ICDAR2003, 2003.
"ICDAR 2005 Text locating competition results," S.M. Lucas, ICDAR 2005, pp. 80-84.
International Search Report and Written Opinion, PCT/US2009/55496, Issued on Nov. 2, 2009, Received Nov. 23, 2009.
"Statistical Region Merging," Nock et al, IEEE Transactions on Pattern Analysis and Machine Intelligence, vol. 26, No. 11, pp. 1452-1458, Nov. 2004.
"A New Robust Algorithm for Video Text Extraction," Wong et al., Pattern Recognition 36, pp. 1397-1406, 2003.
"Video Skimming for Quick Browsing Based on Audio and Image Characterization," Smith et al., CMU-CS-95-186, Carnegie Mellon University School of Computer Science, Jul. 30, 1995.

FIG. 6D
FIG. 6E
FIG. 6F

TEXT LOCALIZATION FOR IMAGE AND VIDEO OCR

CROSS REFERENCE TO RELATED DOCUMENTS

This application is related to and claims priority benefit of U.S. Provisional Patent Application No. 61/190,992 filed Sep. 3, 2008 to Yu, et al. which is hereby incorporated herein by reference. This application is related to U.S. patent application Ser. No. 11/706,919 filed Feb. 14, 2007, Ser. No. 11/706,890 filed Feb. 14, 2007, Ser. No. 11/715,856 filed Mar. 8, 2007 and Ser. No. 11/706,529 filed Feb. 14, 2007, all to Candelore, which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In TV video, text is often present which can provide important content information such as name of the advertised product, URL (Universal Resource Locator) of related information, name of the speaker or the player, location and date of an event etc. The text, either added artificially as closed captions, embedded in the scene, can be utilized to index and retrieve the image and video, analyze the viewers' interest in video content, or provide the viewer related content that can be accessed from the Internet. However, text embedded in ordinary television or video images present special problems in text identification and recognition that are not present when the text recognition is carried out in conventional documents.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

REFERENCED DOCUMENTS

Figure 1:
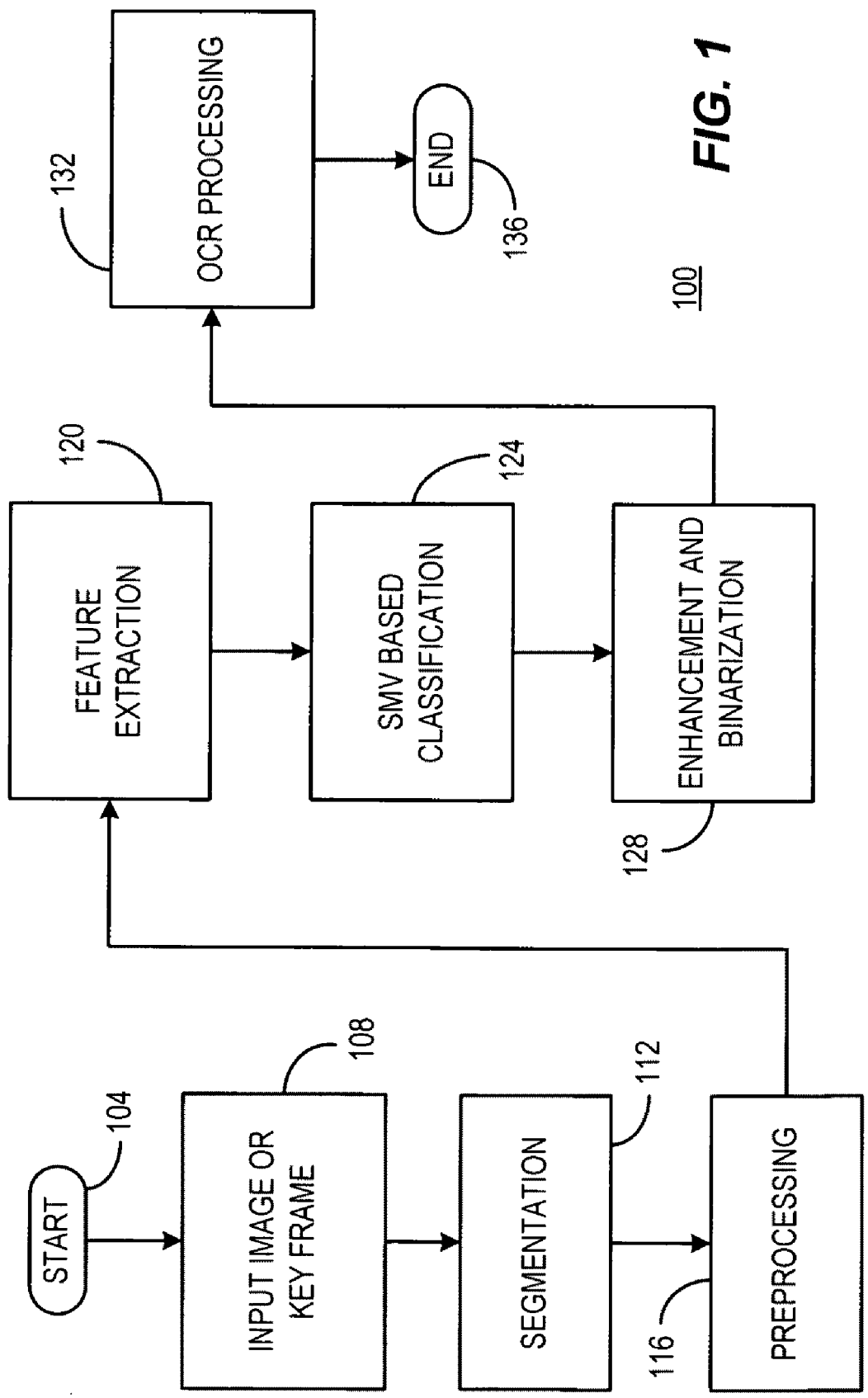
FIG. 1 is an example flow chart of a text localization process consistent with certain embodiments of the present invention.

The following documents are referenced in the detailed description below:

[1] Rainer Lienhart. Video OCR: A survey and practitioner's guide, In Video Mining, Kluwer Academic Publisher, pp. 155-184, October 2003.

[2] Keechul Jung, Kwang In Kim, and Anil K. Jain, Text information extraction in images and video: a survey, Pattern Recognition, 37, pp. 977-997, 2004.

[3] Jian Liang, David Doermann, and Huiping Li. Camera-based analysis of text and documents: a survey, IJDAR, vol 7, No 2-3, 2005.

[4] Anil K. Jain and Bin Yu. Automatic text location in images and video frames, Pattern Recognition, Vol. 31, No 12, 1998.

[5] Shio J. Ohya and S. Akamatsu. Recognizing characters in scene images, IEEE Trans. On Pattern Analysis and Machine Intelligence, Vol 16, No 2, 1994, pp 214-220.

[6] C. M. Lee, A. Kankanhalli, Automatic extraction of characters in complex images, Int. J. Pattern Recognition Artif. Intell. 9(1), 1995, pp 67-82.

[7] M. A. Smith, T. Kanade, Video skimming for quick browsing based on audio and image characterization, Technical Report CMU-CS-95-186, Carnegie Mellon University, July 1995.

[8] D. Chen, K. Shearer and H. Bourlard, Text enhancement with asymmetric filter for video OCR. Proceedings of International Conference on Image Analysis and Processing, Palermo, Italy, 2001, pp. 192-197.

[9] H. Li, D. Doermann, O. Kia, Automatic text detection and tracking in digital video, IEEE Trans. Image Process. 9(1), 2001, pp. 147-156.

[10] D. Chen, H. Boulard, J-P. Thiran. Text identification in complex background using SVM, Proceedings of IEEE Conference on Computer Vision and Pattern Recognition, Vol. 2, 2001, pp. 621-626.

[11] Xiangrong Che, Alan L. Yuille, Detecting and reading text in natural scenes, Proceedings of IEEE Conference on Computer Vision and Pattern Recognition, Vol. 2, 2004, pp. 366-373.

[12] Edward K. Wong and Minya Chen, A new robust algorithm for video text extraction, Pattern Recognition. No. 36, 2003, pp. 1398-1406.

[13] K. Subramanian, P. Natarajan, M. Decerbo and D. Castanon, Character-stroke detection for text-localization and extraction, Proceedings of IEEE Document Analysis and Recognition. Vo. 1, 2007, pp. 23-26.

[14] Richard Nock and Frank Nielsen, Statistical Region Merging, IEEE Trans. On Pattern Analysis and Machine Intelligence, Vol. 26, No. 11, 2004, pp. 1452-1458.

[15] V. Vapnik, "Statistical learning theory", John Wiley and Sons, 1998.

[16] Chih-Chung Chang and Chih-Jen Lin, LIBSVM: a library for support vector machines, 2001. Software available at http://www.csie.ntu.edu.tw/~cjlin/libsv

[17] W. Niblack. An Introduction to Digital Image Processing. pp. 115-116, Prentice Hall, 1986.

[18] N. Otsu. A threshold selection method from gray-level histograms. IEEE Trans. On Systems, Man and Cybernetics, Vol. 9, No. 1, pp. 62-66, 1979.

[19] S. D. Yanowitz and A. M. Bruckstein, A new method for image segmentation, Computer Vision, Graphics and Image Prcoessing CVGIP, Vol. 46, no. 1, pp. 82-95, 1989.

[20] S. M. Lucas, A. Panaretos, L. Sosa, A. Tang, S. Wong and R. Young. ICDAR 2003 robust reading competitions, In 7$^{th}$ International Conference on Document Analysis and Recognition-ICDAR2003, 2003

[21] S. M. Lucas, ICDAR 2005 Text locating competition results, ICDAR 2005, pp. 80-84.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. Throughout the present document, various thresholds are used for comparisons in certain processes. The thresholds disclosed herein and by reference to the above reference materials are for reference in connection with the presently presented example embodiments and are not intended to be limiting on other processes consistent with other implementations.

In TV video, text is often present which can provide important content information such as name of the advertised product, URL (Universal Resource Locator) of related information, name of the speaker or the player, location and date of an event etc. The text, either added artificially as closed captions, embedded in the scene, can be utilized to index and retrieve the image and video, analyze the viewers' interest in video content, or provide the viewer related content that can be accessed from the Internet. However, text embedded in ordinary television or video images present special problems in text identification and recognition that are not present when the text recognition is carried out in conventional documents. Even with relatively high definition video, text can often be presented in relatively low resolution that is more difficult to recognize by machine than is typical with printed text using conventional optical character recognition.

Optical character recognition (OCR) technology can be used to automatically recognizing text from a text document where the resolution is high enough (e.g., more than 300 dpi), and the foreground texts are preferably black on simple structured white background. However, in image or video, the resolution is generally much lower (e.g., 50 dpi or even lower). The poor quality of the image also comes from the noise due to sensor, uneven lighting or compression etc. In addition to that, there is distortion brought by perspective, wide-angle-lens, non-planer surfaces, illumination etc. Finally the text can be on a complex background with moving objects around. In short, there are many variables that conventional OCR technology does not account for when processing images such as video images or frames therefrom. All of these problems often make it difficult or even infeasible to directly apply the OCR technology to image and video data.

In accord with embodiments consistent with the present invention, a first action in recognizing text from image and video is to locate accurately the position of the text in image and video. This turns out to be a very complex problem. After that, the located and possibly low resolution text can be extracted, enhanced and binarized. Finally existing OCR technology can be applied to the binarized text for recognition.

The problem of localizing text in image and video data has been addressed in a number of ways. There are comprehensive reviews of text localization and extraction algorithms in the above references. The following documents are referenced in the detailed description below: [1], [2] and [3] above. Often the methods are classified as region-based, edge-based and texture-based methods.

In region-based methods as described in references [4], [5], [6], characters in text are assumed to have the same color. Regions are generated by connected component analysis, clustering or segmentation algorithms. Then heuristics such as the size, the height/width ratio of the region, or the baselines, are employed to filter out non-text regions. Finally the remaining regions are classified as text or non-text either by heuristic constraints or a trained classifier.

Edge-based methods as described in references [7] [7 and [8] are based on the observation that text exhibits a strong edge against background, and therefore text regions are clusters of edges, so the first step is edge detection. Then by smoothing and merging, edges are clustered. Finally those clusters are classified as text or non-text either by heuristic constraints or a trained classifier.

Texture-based methods make use of texture features to decide whether a pixel or a region belongs to text or not. The whole image is scanned pixel by pixel or block by block to extract texture features such as local spatial variance, horizontal variance, second order statistics, frequency features, local energy or high order moments of wavelet transform etc. The features then feed into a classifier (neural network [9], support vector machine [10], or adaboosting [11]) to classify the pixel or the block to be text or not. Finally the pixels or blocks are merged to generate the final text area.

The technique described herein can be broadly characterized as a region-based text localization method. A fast and effective image segmentation algorithm is first utilized to extract regions of similar colors. After preprocessing where heuristics are applied to filter out regions not supposed to be text, features of each region are analyzed. Based on the observation that strokes in text tend to have similar width, stroke features are extracted. In addition, important edge features and fill factor features are subtracted. Finally a support vector machine (SVM) classifier (a classifier separates objects having different groupings) is trained to classify regions into text and non-text. An SVM is used to maximize the difference between text and non-text.

Stroke features are employed to assist in identifying text. It is noted that generally the widths of the strokes in text are similar both horizontally and vertically. In references [12] and [13], stroke features are also used, however, only the horizontal stroke widths are checked for text detection. Here features of stroke widths in both horizontal and vertical direction are extracted. In addition, edge and other important features are combined for classification.

I. System and Process Overview

FIG. 1 is an example flow chart of a video OCR process 100 consistent with certain embodiments starting at 104. This figure can also be viewed as a system diagram with each block of the figure representing a functional block of the system that can be implemented using programmed processors and/or state machines and/or dedicated hardware. At 108, the system receives input images or key frames. Then the image is segmented into regions of similar colors at 112. If those regions are assigned a representative color, the resulting image resembles one that is rendered in a limited number of colors and the image has a blocky appearance at the boundaries of the color regions. These regions are filtered by heuristic constraints such as size, aspect ratio, fill factor etc. at preprocessing block 116. Features of the remaining regions are extracted at 120. These features are fed into an SVM classifier at 124 which classifies the regions into text and non-text regions. Those text regions are enhanced and binarized at 128. Finally OCR processing is carried out in an OCR engine at 132 that may be implemented in the form of a programmed processor. The OCR engine acts on the binarized regions and outputs the recognition result in the form of recognized text, and the process ends at 136. The various elements of FIG. 1 are described in greater detail below.

II. Text Localization by SVM

A. Segmentation

Figure 2A:
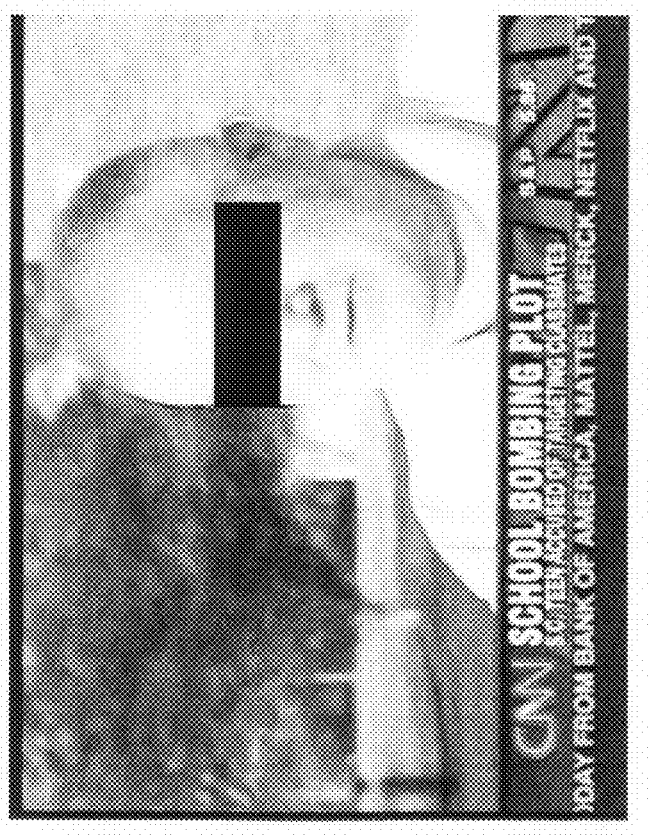
FIG. 2 which is made up of FIGS. 2A and FIG. 2B, is an example image before and after processing in a manner consistent with certain embodiments of the present invention.
Figure 2B:
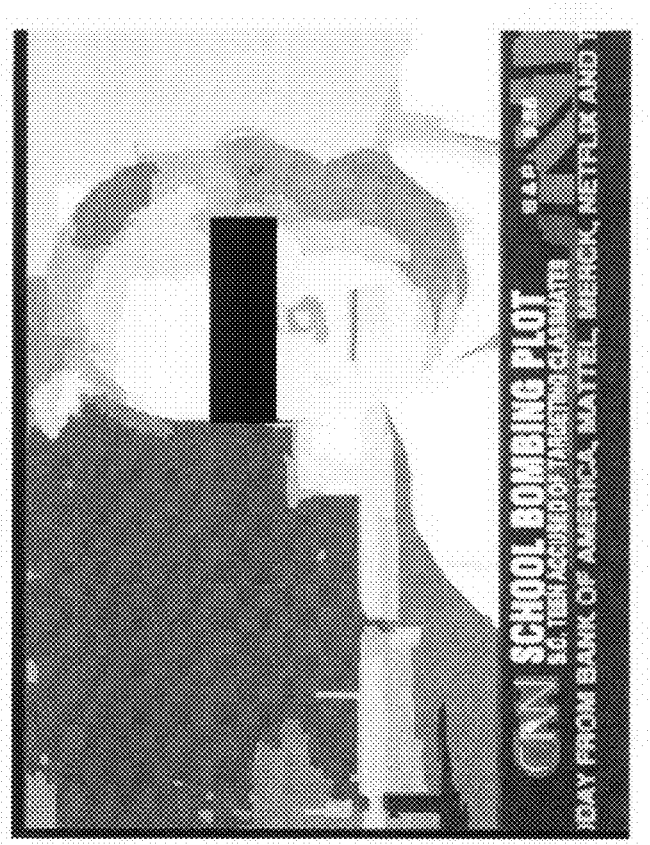

In accord with certain implementations, the statistical region merging algorithm described in reference [14] is applied to the input image to get regions of similar color, but other algorithms could also be used. For purposes of this document, the term "similar color" means, as used herein in one example implementation, that the absolute difference of the average red, green, blue (R, G, B) values of two regions (where one region is designated by the prime symbol, and where the overscore represents an average value) are within a merging threshold which can be formulated as follows:

$$(\overline{R}-\overline{R}')^2 < T_{dev}, (\overline{G}-\overline{G}')^2 < T_{dev}, (\overline{B}-\overline{B}')^2 < T_{dev},$$

where $T_{dev}$ is a merging threshold such as those provided in reference [14]. Other merging thresholds and other definitions of similar color may also be appropriate in other implementations. Unlike most of the other known segmentation algorithms, which use more or less restrictive assumptions on distributions, this algorithm is currently preferred because it is based on an image generation model with few assumptions, which makes the algorithm effective in all kinds of scenarios. The algorithm is carried out in three phases. The first phase is to calculate the color difference of neighboring pixels. The second phase involves sorting the pixels according to their color difference. The third phase involves merging pixels with color difference smaller than a threshold so that regions are generated. It has been established that the algorithm only suffers over-merging error, and achieves with high probability a low error in segmentation. Finally the algorithm can be efficiently approximated in linear time/space leading to a fast segmentation algorithm. FIG. 2 of the above referenced Provisional Patent Application 61/190,992 shows an example output of the segmentation algorithm, and is reproduced here as FIG. 2A and FIG. 2B.

B. Preprocessing

After segmentation, regions of similar colors are obtained. The goal is to classify those regions into text and non-text regions. To improve the efficiency of the classification, those regions that are very unlikely to be text are first removed. So the following conditions are checked in one implementation:

(1) If region_height is smaller than some threshold T_low, or the region_height is larger than some threshold T_high, the region is discarded;

(2) If region_area is smaller than some threshold T_area, the regions is discarded;

(3) If the region touches one of the four sides of the image border, and its height is larger than a threshold T, the region is discarded;

(4) If a fill_factor defined as $$\text{fill\_factor} = \frac{\text{Region Area}}{\text{Bounding Box Area}}, \quad (1)$$

is lower than a threshold T_fill. it is discarded.

The above thresholds are selected empirically. In this example implementation, the values that were used are as follows:

T_low=10

T_high=HEIGHT*0.9 (HEIGHT is the height of the image size)

T_area=12

T=HEIGHT/2

T_fill=0.1

Other values may be suitable for other implementations and the present values may be further optimized empirically.

Characters tend to appear in clusters and it is much easier to classify clusters of characters. Characters in the same word usually have the same color, and most of the time they are horizontally aligned. Due to the above facts, regions are grouped if their size and color are similar and their horizontal positions are within a threshold.

Figure 3:
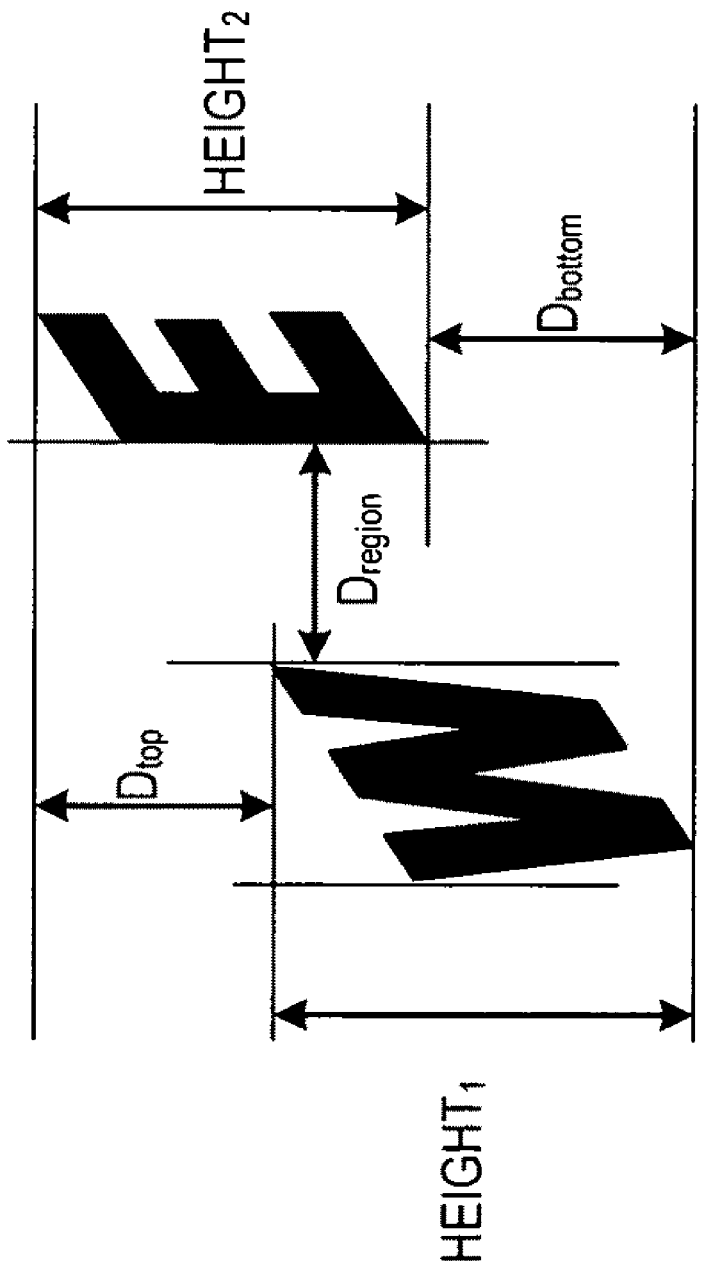
FIG. 3 illustrates parameters used in the merging groups of an example implementation consistent with certain embodiments of the present invention.

FIG. 3 depicts the parameters $D_{region}$, $D_{top}$ and $D_{bottom}$ used in merging or grouping regions in the present example implementation as follows:
The merging or grouping rules used in an example implementation are as follows, $$\text{rule 1. (height similarity)} \frac{\max(HEIGHT_1, HEIGHT_2)}{\min(HEIGHT_1, HEIGHT_2)} < T_{height\_sim}$$

where $HEIGHT_1$ and $HEIGHT_2$ are the height of the two regions.

rule 2. (color similarity) $D(c_1, c_2) =$ $$\sqrt{(\overline{R_1} - \overline{R_2})^2 + (\overline{G_1} - \overline{G_2})^2 + (\overline{B_1} - \overline{B_2})^2} < T_{color}$$

where $c_1 = [\overline{R_1}\ \overline{G_1}\ \overline{B_1}]$ and $c_2 = [\overline{R_2}\ \overline{G_1}\ \overline{B_1}]$ are the average color of the two regions.
rule 3. (region distance) $D_{region} < T_{region}$
where $D_{region}$ is the horizontal distance of the two regions.
rule 4. (horizontal alignment) $D_{top} < T_{align}$ or $D_{bottom} < T_{align}$
where $D_{top}$ and $D_{bottom}$ are the vertical distances between the top boundary and bottom boundary. Refer to FIG. 3 for definition of $D_{region}$, $D_{top}$ and $D_{bottom}$. The thresholds are set empirically as follows, but other settings may be suitable for other implementations, rules and rule modifications, and these thresholds may be further optimized:

$$T_{height\_sim} = 2.5$$
$$T_{color} = 80$$
$$T_{region} = HEIGHT_1 + HEIGHT_2$$
$$T_{align} = \max\left(1, 0.4 \cdot \frac{HEIGHT_1 + HEIGHT_2}{2}\right)$$

Figure 4:
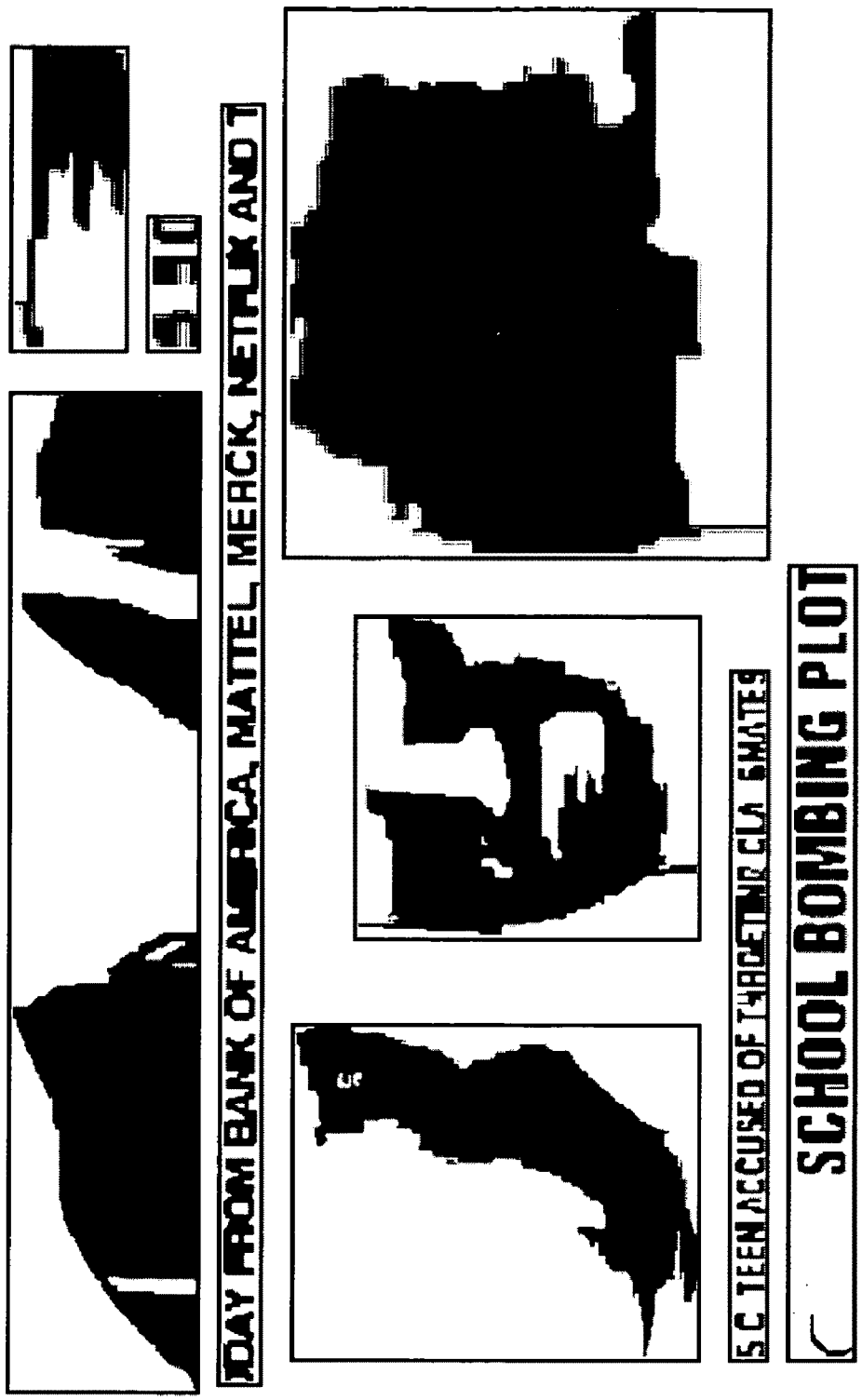
FIG. 4 shows some of the extracted regions after preprocessing the segmented image of FIG. 2B in a manner consistent with certain embodiments of the present invention.

FIG. 4 shows some of the extracted regions after preprocessing the segmented image in FIG. 2 of the provisional patent application (FIG. 2). In FIG. 4, the boxes depict the boundaries of a box enclosing each of the example regions, the black areas are the foreground regions and the white areas are the background regions. The next task is to classify those regions into text and non-text regions.

C. Feature Extraction

The features of the remaining regions are then extracted. The features we used are stroke width feature, edge feature and fill factor feature, which are elaborated as follows.

Stroke Width Feature

Figure 5A:
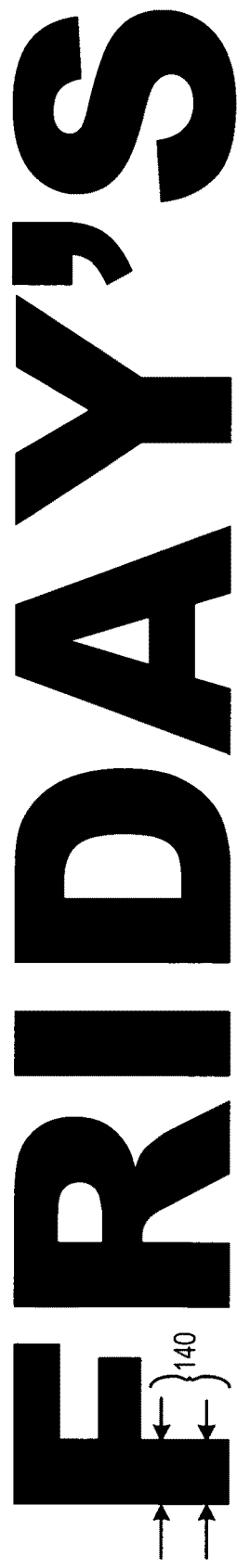
FIG. 5, which is made up of FIGS. 5A and FIG. 5B, shows stroke width parameters as used in a manner consistent with certain embodiments of the present invention.
Figure 5B:
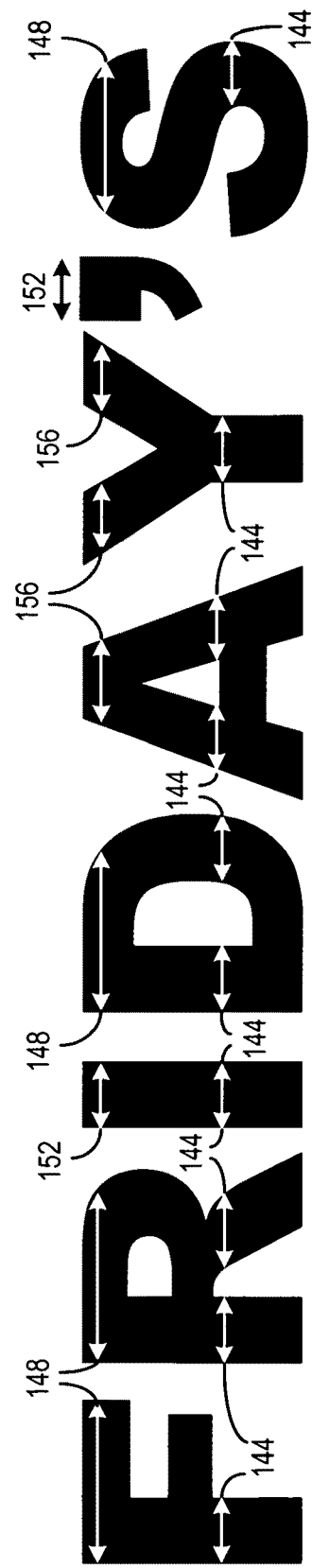

FIG. 5, which is made up of FIG. 5A-5B, illustrates the concept of stroke width. For purposes of this document, stroke width is considered the width in pixels in the horizontal direction between two edges of a stroke. The actual width is not particularly important in the present method which uses the percentage of neighborhoods whose variance in stroke width is within a threshold.

The stroke width feature is based on the observation that the stroke width within a text element tends to be similar both in vertical direction and horizontal direction, which is illustrated in FIG. 5. FIG. 5A shows that the width of an example stroke in the letter "F" is approximately constant in a vertical neighborhood defined by the bracket 140. The arrows show width in this area of the character F. FIG. 5B shows that horizontally the strokes have similar widths (i.e., approximately equal) or can be clustered into groups with similar width. In this figure, each of the reference numbers 144, 148, 152 and 156 depict approximately common widths.

The term "neighborhood" as used in the present context is a range of vertical distance that contains a stroke, and when you say that the text element is similar in the vertical direction, this means that the width is within a vertical neighborhood. For the horizontal direction, the stroke width is compared in the same row or with the same y coordinates.

The feature that reflects an approximately constant vertical stroke width is calculated as follows. First calculated is the standard deviation of the stroke widths in a vertical neighborhood. A vertical neighborhood is defined as used herein as pixels with coordinates (x,y) where $x=c, r \leq y \leq r+T_n$ for every pixel within the region $(c,r) \in [ROW_{region}, HEIGHT_{region}]$. The feature value $s_1$ is the percentage of the neighborhood in the whole region whose standard deviation of stroke width is within a threshold.

Similarly, the feature of horizontal stroke width is also calculated. The stroke widths in a row are calculated and clustered, where a "row" is defined as pixels with the same y coordinates. Those clusters with member number less than three in this example, where the member number is the number of members in the cluster, or the number of strokes with similar stroke widths because the clusters are obtained according to similarities of the stroke widths. Those clusters with few members or in another words strokes with few similar stroke widths are considered noisy or outliers and are excluded for consideration and are thus not taken into account. In this way, outliers are excluded, where an outlier is defined as the cluster with few members (here less than three members or stroke clusters with less than three strokes who have similar stroke widths). Another reason of clustering is that there may be different strokes in a row. For example, in the upper row of FIG. 5B, there are three clusters of different stroke widths labeled 148, 152 and 156. The feature value $s_2$ that reflects constant horizontal stroke width is the percentage of the rows whose standard deviation of horizontal stroke width is within a threshold, or who can be clustered into groups and standard deviation of horizontal stroke width in each group is within a threshold.

Based on the observation that there is some distance between strokes of texts, feature value $s_3$ is extracted as the average ratio of the current stroke width and the distance of the current stroke to the next neighboring stroke.

The last stroke feature $s_4$ is the ratio of the two stroke widths that appear the most often.

The following is an example of psudo-code for a process used in an example implementation for extracting stroke width features:

---

Psudo-code of extracting stroke width features s1, s2, s3, s4

---

Feature $s_1$: measure of constant vertical stroke width
s1=VerticalConstStrokeWidth(img)

| Psudo-code of extracting stroke width features s1, s2, s3, s4 |
| --- |
| Input: | img: the binary image to be classified as text or nontext: foreground is black, background is white, that is img(foreground)=0, img(background)=1, the number of rows in the image is HEIGHT, the number of columns in the image is WIDTH
Output:

s1: feature value that measures the constant vertical stroke width
1. For each pixel (x,y) in img, calculate the stroke width array StrokeWidthMap
    a. For pixels (x,y) in the background, the stroke width is 0:
       StrokeWidthMap(x,y)=0;
    b. For pixels in the foreground, the stroke width is the distance between the edges of the current stroke. For example in FIG. A, the pixels in the red line all will have stroke width of 30 − 10 = 20, that is StrokeWidthMap(10:30, 60)=20. (note: 10:30 means coordinates from 10 to 30)
2. An array StrokeWidthMap of stroke width map for each pixel (x, y) is obtained (note: StrokeWidthMap has the same dimension as img)
3. For (x, y ∈ [r, r+Tn]), (in other words, for each column x, and for each the neighborhood of Tn rows where Tn is defined as
$$Tn = \max(2, \text{ceil}(HEIGHT/10))$$
    a. Calculate the median of stroke width:
       medianW=median(StrokeWidthMap(x, r:r+Tn))
    b. Calculate the standard deviation of the stroke width
       stdW=std(StrokeWidthMap(x, r:r+Tn)).
    c. If the following conditions are satisfied
       medianW<WIDTH/3 (the median stroke width not too large)
         stdW<medianW*0.5 (standard deviation is small)
      then this neighborhood has constant vertical stroke width, so
        constStrokeNum=constStrokeNum+1.
4. The feature $s_1$ is the raio of neighborhoods that have constant vertical stroke width:
$$s1 = constStrokeNum/total,$$
where total is the number of neighborhoods that have strokes Feature s2: measure of constant horizontal stroke width
s2=HorizontalConstStrokeWidth(img)
Input:

img: the binary image to be classified as text or nontext: foreground is black, background is white, that is img(foreground)=0, img(background)=1. The number of rows in the image is HEIGHT, the number of coloumns in the image is WIDTH
Output:

s2: feature value that measures the constant vertical stroke width
1. For each row y in img, calculate the stroke width for the current row and get an array StrokeWidth (StrokeWidth has the same number of rows as img, and each row has the stroke widths for the strokes in the current row);
2. For each row y in StrokeWidth:
    a. Calculate median of the StrokeWidth:
       median W=median(StrokeWidth(y));
    b. Calculate the standard deviation of StrokeWidth:
       stdW=std(StrokeWidth(y));
    c. If the ratio of standard deviation and median of stroke width is less than a threshold, that is,
       stdW/medianW<WidthStdT (threshold WidthStdT=0.5)
      then it is counted as a row with horizontal constant stroke width, that is,
        constStrokeNum=constStrokeNum+1
    d. Otherwise, cluster the StrokeWidth(y). If any one of the clusters has more than 3 members (not outliers) and their median and standard deviation satisfies
       stdW/medianW<WidthStdT
      then it is counted as a row with horizontal constant stroke width, that is,
        constStrokeNum=constStrokeNum+1;
3. Feature s2 is
$$s2 = constStrokeNum/total$$
    where total is the number of rows in the image that have more than one stroke Feature s3: ratio of the distance of the current stroke to the next neighboring stroke and the stroke width
s3=RatioStrokeDistWidth(img)
Input:

img: the binary image to be classified as text or nontext: foreground is black, background is white, that is img(foreground)=0, img(background)=1, the number of rows in the image is HEIGHT, the number of coloumns in the image is WIDTH

| Psudo-code of extracting stroke width features s1, s2, s3, s4 |
|---|
| Output: |
| s3: the ratio of the distance of the current stroke to the next neighboring stroke and the stroke width<br>1. Calculate the stroke width StrokeWidth (it is the same one as in extracting feature s2);<br>2. Calculate the distance of the current stroke to the next neighboring stroke StrokeDist;<br>3. Calculate the ratio<br>    ratio=StrokeDist/StrokeWidth;<br>4. Put ratio in the array StrokeDistWidthRatio<br>5. Feature s3=median(StrokeDistWidthRatio)<br>Feature s4: ratio of the most common stroke width<br>s4=RatioMostStrokeWidth(img)<br>Input: |
| img: the binary image to be classified as text or nontext: foreground is black, background is white, that is img(foreground)=0, img(background)=1. The number of rows in the image is HEIGHT, the number of coloumns in the image is WIDTH<br>Output: |
| s4: the ratio of the most common stroke width<br>1. Calculate the histogram H of the stroke width array StrokeWidth: [H, Xw]=hist(StrokeWidth, 10), where 10 is the bin number for calculating the histogram, H is the histogram or the frequency of the bin, Xw is the bin location;<br>2. Sort the histogram [sH, sI]=sort(H), where sH is the sorted histogram, and sI is the index, that is sH=H(sI);<br>3. If sH(1)/sum(sH)==1 (there is only one stroke width), s4=0;<br>4. Otherwise, s4=Xw(sI(1))/Xw(sI(2)), sI(1) and sI(2) is the index of the most common stroke width. |

In each case above, text widths are measured in pixels, but other measurement increments may be possible.

Edge Features

A set of edge features ($e_1, e_2, e_3$) is also used in the example implementation. In text, there are a lot of edges. So edge features can be used to assist in text localization. The first edge feature $e_1$ is based on the fact that text characters generally have smooth edges. The feature value $e_1$ is calculated as the ratio of a 5×5 neighborhood that has the same direction, i.e., the block having smooth direction. Edge feature $e_2$ is based on the observation that text characters usually have edges of all directions. The feature value $e_2$ is the frequency of the edge direction that appears the most often. If the frequency is very large, then quite probably it is not text because usually text characters have edges of all directions. That is why it is chosen as a feature to differentiate text and non-text regions. Finally is the ratio of the length of the total edges to the area of the region, which can characterize the amount of edges that texts have.

The following is the psudo-code used for extracting edge features in an example implementation:

| Psudo-code of extracting Edge Feature (e1, e2, e3)hz,1/38 |
|---|
| Feature e1: edge smoothness<br>e1 = EdgeSmoothness(img)<br>Input: |
| img: the binary image to be classified as text or nontext: foreground is black, background is white, that is img(foreground) = 0, img(background) = 1. The number of rows in the image is HEIGHT, the number of coloumns in the image is WIDTH.<br>Output: |
| e1: the feature that measures the smoothness of edges<br>1. Edge extraction: extract the edge of 8 directions (0, $\pi/4$, $\pi/2$, $3\pi/4$, $\pi$, $5\pi/4$, $3\pi/2$, $7\pi/4$) using Sobel edge detection:<br>    Edge = SobelEdge(img)<br>where Edge has the same dimension as img and at the place of edge it has the value of 1 to 8 depending or the direction of the edge, and at the place of non-edge it has the value of 0;<br>2. For (x, y) that satisfy Edge(x, y) ≠ 0<br>   a. Define neighborhood: neighborhood = edge([x − w: x +w], [y − w: y + w]), where<br>$$\begin{cases} \text{if img's height is less than 25: } w = 1 \\ \text{Otherwise: } w = 2 \end{cases}$$ |

Psudo-code of extracting Edge Feature (e1, e2, e3)hz,1/38

```
        b. Get current direction: curDir = Edge(x, y)
        c. Get the number of pixels that have the current direction curDirNum
        d. Get the number of edge pixel in the neighborhood, that is,
              neighborEdgeNum = Length(neighborhood ≠ 0)
        e. Calculate the ratio of the edge pixels with the same direction:
              R(x, y) = curDirNum/ neighborEdgeNum;
    3. Calculate the edge smoothness feature
              e1 = length(R > T)/length(Edge ≠ 0).
Feature e2: Uniformity of edge direction
e2 = EdgeUniformity(img)
Input:
``` img: the binary image to be classified as text or nontext: foreground is black,
background is white, that is img(foreground) = 0, img(background) = 1. The
number of rows in the image is HEIGHT, the number of coloumns in the image
is WIDTH.
Output:

```
e2: the feature that measures the uniformity of edges
    1. Quantize the 8 edge directions extracted in step 1 of feature e1 into 4
         directions Edge4, that is, (5π/4, 3π/2, 7π/4) in Edge will become (π/4, π/2,
         3π/4) in Edge4;
    2. Calculate the histogram of the 4 directions: H = hist(Edge4(Edge4 ≠ 0));
    3. Calculate the maximal of H: maxH = max(H), so maxH is the maximal
         times the direction appears;
    4. Calculate the edge uniformity feature
              e2 = maxH/sum(H)
Feature e3: Amount of edges
e3 = EdgeAmount(img)
Input:
``` img: the binary image to be classified as text or nontext: foreground is black,
background is white, that is img(foreground) = 0, img(background) = 1. The
number of rows in the image is HEIGHT, the number of coloumns in the image
is WIDTH
Output:

```
e2: the feature that measures the amount of edges
    1. Edge extraction: extract the edge of 8 directions (0, π/4, π/2, 3π/4, π,
         5π/4, 3π/2, 7π/4) using Sobel edge detection:
              Edge = SobelEdge(img)
where Edge has the same dimension as img and at the place of edge it has the
value of 1 to 8 depending or the direction of the edge, and at the place of non-
edge it has the value of 0;
    2. Calculate the length of edge: EdgeLength = length(Edge ≠ 0);
    3. Calculate the foreground area of img:
    4. ForeArea = length(img(foreground));
    5. Calculate the fill factor AreaFill:
    6. AreaFill = ForeArea/(WIDTH*HEIGHT);
    7. Calculate the feature e3 = EdgeLength/AreaFill.
```

Fill Features

A set of fill factor features ($f_1$, $f_2$) are also used in this example implementation. This group of the feature is based on the fact that the foreground of the text fills in the bounding box. It does not fill the whole bounding box, or fills little of the bounding box. Also in a small neighborhood, it has the property that the foreground does not fill the whole neighborhood.

The first fill factor feature $f_1$ describes the filling feature of the whole region. So it is calculated as the ratio of the foreground area and the area of the bounding box of the region. The second fill factor feature $f_2$ describes the filling feature of a local neighborhood. The ratio of the foreground area in a neighborhood is first calculated. The feature value $f_2$ is the percentage of the neighborhoods that the ratio of the foreground area is greater than a threshold.

The following is the psudo-code for extracting fill factor features as used in an example implementation:

Psudo-code of extracting Fill Factor Feature f1, f2

Feature f1: Filling feature of the whole region
f1=FillFactorWhole(img)
img: the binary image to be classified as text or nontext: foreground is black,
background is white, that is img(foreground)=0, img(background)=1. The
number of rows in the image is HEIGHT, the number of coloumns in the image
is WIDTH.

-continued

Psudo-code of extracting Fill Factor Feature f1, f2

Output:

f1: the feature that measures the filling factor of the candidate image
1. Calculate the foreground area of the img:
2. ForeArea=length(img(foreground));
3. Calculate the whole area of img: WholeArea=WIDTH×HEIGHT;
4. Calculate the feature f1=ForeArea/WholeArea.
Feature f2: Filling feature of local neighborhoods
f2=FillFactorNeighborhood(img)
img: the binary image to be classified as text or nontext: foreground is black, background is white, that is img(foreground)=0, img(background)=1. The number of rows in the image is HEIGHT, the number of columns in the image is WIDTH.
Output:

f2: the feature that measures the filling factor in local neighborhoods of the candidate image
1. For (x,y) where x,y increase by stepSize=HEIGHT/3
   a. Get the current neighborhood: curN=img(x:x+stepSize, y:y+stepSize);
   b. Calculate the area of foreground in the current neighborhood: AreaN=length(curN(foreground));
   c. Calculate the fill factor of the neighborhood: FillFactorN(j)=AreaN/Area(curN) where j is the index for the current neighborhood;
2. Get the number of neighborhoods that has large fill factor
                 N=length(FillFactorN>T);
3. The feature f2 is the percentage of those blocks that has large fill factor:
                 f2=N/length(FillFactorN)

D. SVM-Based Classification

SVM is described in reference [15] and is a technique motivated by statistical learning theory and has been successfully applied to numerous classification tasks. The key idea is to separate two classes with a decision surface that has maximum margin. It minimizes a bound on the generalization error of a model in the high dimensional space rather than a training error. In SVM, the learning task is insensitive to the relative numbers of training examples in positive and negative classes (In the detection task here, the negative class has many more samples than the positive class.). Therefore SVM is chosen as the preferred classifier for this example implementation.

The classification problem is a binary classification problem with m labeled training samples: $(x_1, y_1), (x_2, y_2), \ldots, (x_m, y_m)$, where $x_i=[s_1^i, s_2^i, s_3^i, s_4^i, e_1^i, e_2^i, e_3^i, f_1^i, f_2^i]$ with each component as defined in section C., a 9-dimension feature vector, $y_i=\pm 1$, indicating positive (text) and negative (non-text) classes (i=1, 2, ..., m). SVM tries to solve the following problem:

$$\min_{w,b,\xi_i} \frac{1}{2} w^T w + C \sum_{i=1}^{l} \xi_i \qquad (2)$$

$$\text{subject to } y_i(w^T \phi(x_i)+b) \geq 1-\xi_i \qquad (3)$$

Its dual is $$\min_{\alpha} \frac{1}{2} \alpha^T Q \alpha - e^T \alpha \qquad (4)$$

$$\text{subject to } y^T \alpha = 0 \ (0 \leq \alpha_i \leq C, i=1, \ldots, l) \qquad (5)$$

where e is the vector of all ones, C>0 is the upper bound and is decided by cross validation, Q is an l by l semi-definite matrix, $Q_{ij}=y_i y_j K(x_i,x_j)$ and $K(x_i,x_j)\equiv\phi(x_i)^T\phi(x_j)$ is the kernel, w, α and b are the parameters that decide the separating plane and should be solved by the optimization process. By choosing a nonlinear kernel function, the feature vectors $x_i$ can be mapped into a higher dimensional space by the function φ. The kernel we use is radial basis function kernel $$K(X, X_j) = \exp\left\{\frac{-\|X - X_j\|^2}{2\sigma^2}\right\} \qquad (6)$$

where the kernel bandwidth σ was determined through cross validation. Once the parameters w, α and b are decided, the following decision function can be used to classify the regions $$\mathrm{sgn}\left(\sum_{i=1}^{l} y_i \alpha_i K(x_i, x) + b\right). \qquad (7)$$

The SVM was trained on a set of samples labeled as text or non-text, using the software package named LIBSVM [16]. Cross validation is used to decide the kernel bandwidth σ and C. The training and testing results will be reported in the next section.

E. Enhancement and Binarization

After text regions have been identified, they should be enhanced and binarized so that OCR software can recognize the text easily. Most OCR software can only recognize text with large enough resolution. So if the height of the text is less than about 75 pixels (currently), scaling up may be needed. Before the scaling up, some enhancements can be applied such as histogram equalization, sharpening etc.

Binarization is then applied to the enhanced image. There are different kinds of binarization algorithms such as Niblack's adaptive binarization algorithm [17], Otsu's method [18], and Yanowitz-Bruchstein's method [19] etc. Among those methods, Niblack's method and Otsu's method are widely used, but other binarization methods can be adapted to implementations consistent with the present invention. In Niblack's method, a threshold T is adaptively determined for each pixel from the intensity statistics within a local window of size r $$T_r(x) = \mu_r(x) + k\sigma_r(x) \qquad (8)$$

where μ and σ are the mean and standard deviation of the pixel intensities within the window. The scalar parameter k is the weight which is set to be −0.2. The window size r can be a fixed value or adaptively chosen. In [11], it is proposed that the window size r is chosen as $$r(x) = \min_r(\sigma_r(x) > T_\sigma) \qquad (9)$$

where $T_\sigma$ is a fixed threshold. The value of $T_\sigma$ is selected so that windows with standard deviations less $T_\sigma$ are smooth areas. Here we set $T_\sigma$ as the standard deviation of the background area of the detected text region. In Otsu's method [18] the binarization threshold is found by the discriminating criterion, that is, maximizing between class variance, and minimizing within class variance. Otsu's method can be applied to the whole text region or a fixed-size window or an adaptive as in (9). Due to the fact that in images the background is complex, if binarization is applied on the whole image, the non-text object in the background may also appear in the final binarized image. To avoid that, binarization is also applied to the connected components in the detected text region.

Figure 6A:
FIG. 6, which is made up of FIGS. 6A through FIG. 6F, shows binarization results for several examples consistent with certain embodiments of the present invention.
Figure 6B:
Figure 6C:

FIG. 6, which is made up of FIGS. 6A-6F shows the binarization results when Otsu's method and Niblack's method are applied to the individual component, a fixed window, an adaptive window and the whole bounding box. The text detected is from the example illustrated at the bottom of FIG. 2. FIG. 6A shows Otsu's binarization over each connected component in the detected region. FIG. 6B shows Niblack's binarization in an adaptive window. FIG. 6C shows Otsu's binarization in an adaptive window. FIG. 6D shows Otsu's binarization in the whole bounding box. FIG. 6E shows Niblack's binarization in a fixed window. FIG. 6F shows Otsu's binarization in a fixed window From FIG. 6, it can be seen that the performance of different binarization methods differs. it shows that Otsu's method applied in the whole bounding box is the best in this example. Those methods were tried in different images, and it was determined that no single method can give the best results on all the images. So in practice, one possible solution is to feed the results of different binarization methods into the OCR software and then combine the recognition results.

III. Experiments and Results

The present algorithms were tested on two sets of data. One is ICDAR2003's text localization competition data set [20]. In ICDAR2003's data set, there are 248 images in the training set and 251 images in the test set. In each set there are about 1000 segments of text. Most of the images in the data set were taken outside with a handheld device. The other data set was collected from TV programs including images from news, commercial ads, sports games etc. There are 489 images in the data set with nearly 5000 segments of text.

The algorithm was first applied on the ICDAR2003's data set. The images were first segmented and preprocessed. In the training data set, after the segmentation and preprocessing, there are 841 segments of text regions and 3373 segments of non-text regions. It was noticed that the number of text segments is less than the ground-truth. This is partly due to segmentation error where some text segments are not correctly segmented, partly due to preprocessing where some text segments are merged together. SVM was trained on the processed data set. Cross validation was used to select the parameters of SVM. The optimal bandwidth σ in (6) is 0.5 and parameter C in (2) is 32. The trained SVM model was applied on the test data set. A correct detecting rate of 90.02% was obtained from the testing text samples with a false positive of 6.45%. To compare with other text localization algorithm, the precision and recall measure [21] was used for measuring text localization performance. Table 1 summarizes the performance of the present algorithm and the performances of the winners in ICDAR 2003 and ICDAR 2005. The present algorithm ranks number three. It is believed that with careful tuning the parameters in our algorithm, the performance can be further improved. In Table 1, f is defined as $$f = \frac{1}{\alpha/p + (1-\alpha)/r}$$

where p is precision an r is recall. Refer to [20] and [21] for detailed definition of precision and recall.

TABLE 1

Comparison with winners of ICDAR2003 [20] and ICDAR2005 [21].

| System | Precision | Recall | f |
|---|---|---|---|
| Hinnerk Becker | 0.62 | 0.67 | 0.62 |
| Alex Chen | 0.60 | 0.60 | 0.58 |
| Our Algorithm | 0.58 | 0.45 | 0.51 |
| Ashida | 0.55 | 0.46 | 0.50 |

Next the algorithm was applied to the TV data set. The data set was split into two sets, one for training (with 245 images) and the other for testing (with 244 images). After segmentation and preprocessing, there are 1100 segments of text regions and 7200 segments of non-text regions in the training set. SVM was trained on the training set. Cross validation was used to select the parameters of SVM. The optimal bandwidth σ in (6) is 1 and parameter C in (2) is 16. The trained SVM model was applied on the test data set where there are about 850 segments of text regions and 6500 segments of non-text regions. The detection rate of text was 88.29% with the false positive 9.34%. FIG. 7 of the above provisional patent application shows an example detection result for an image in TV data set.

The detected text region was enhanced and binarized as described above. Then binarized images were fed into OCR software for recognition. For example, the binarized images in FIG. 6 were fed into Scansoft's Omnipage™ Pro 12 for recognition. The recognized results were listed in Table 2 below. Table 2 shows that the OCR software can recognize almost all the text. By combing the recognition results from different binarization schemes and looking up results in a dictionary, correct recognition results can be usually obtained.

TABLE 2

Recognition results of Scansoft's Omnipage Pro 12

| FIG. | RECOGNIZED RESULT |
|---|---|
| FIG. 6A | )DAY FROM BANK OF AMERICA, MATTEL, MERCK, NETFLIX AND T<br>SCHOOL BOMBING PLOT<br>S C TEEN ACCUSED OF TARGnNG CLASSMATES |
| FIG. 6B | DAY FROM BANK OAMERICA, MATTEL, MERCK, NETFLIX AND<br>„.: SCHOOL ;BOMBING.PI.O ~~~ SaP '8.<br>tom<br>1s,cr~r~AccusEn o~aa~u~a~a~nss r~s |
| FIG. 6C | )DAY FROM BANK OF AMERICA, MATTEL, MERCK, NETFUX AND 7<br>SCHOOL BOMBING PLOT ..s;P g,s_<br>St TEENACCUSED OF TARGETING CLASSMATES<br>-.a- In |
| FIG. 6D | )DAY FROM BANK OF AMERICA, MATTEL, MERCK, NETFLIX AND T<br>CNN SCHOOL BOMBING PLOT<br>St TEEN ACCUSED OF TARGETING CLASSMATES |
| FIG. 6E | _DAY FROM BANK OF AMERICA, MATTEL, MERCK, NETFLIX AND.;<br>SCHOOL BOMBING.PLOT~8~ ~Q<br>L8At1TEEH~AQCU86D_OF,MRGEM'Q' ' SNIATEB+ |
| FIG. 6F | )DAY FROM BANK OF AMERICA, MATTEL, MERCK, NETFUX AND T<br>SCHOOL BOMBING PLOT aw 86P g.sa ,i<br>SC. IEEN ACCUSED OF ThRGET1NG CLASSMATES<br>4 r_-I |

As described above, a region-based approach is used to localize text in image or video. Segmentation is used to get regions of different colors. Then features of each region are extracted. The features extracted here are stroke features, edge features and fill factor features. The features are very effective in detecting the text. The extracted feature vectors are used to train SVM model which classifies regions as text or non-text regions. The algorithm was shown to perform very well on both the publicly available data set and other data sets.

Thus, in accord with certain example implementations, a method of text detection in a video image involves, at an image processor, receiving a video frame that potentially contains text; segmenting the image into regions having similar color; identifying high likelihood non-text regions from the regions having similar color and discarding the high likelihood non-text regions; merging remaining regions based on similarity of their size and color and alignment of their horizontal positions; carrying out a feature extraction process to extract stroke features, edge features, and fill factor features on the merged regions,; passing the extracted feature vectors of each regions through a trained binary classifier to decide which regions are text and which regions are non-text.

In certain implementations, the method further involves passing the binarized classified text regions through an optical character reader. In certain implementations, segmenting the image into regions of similar color is carried out by determining that the absolute difference of the average red, green blue (R, G, B) values of two regions are each less than a merging threshold. In certain implementations, the segmenting involves calculating a color difference of neighboring pixels; sorting the pixels according to their color difference, and merging pixels with color difference smaller than a threshold so that regions are generated. In certain implementations, the binary classifier comprises a support vector machine (SVM) based classifier. In certain implementations, stroke width are considered similar if the stroke width values are within a threshold value. In certain implementations, the stroke width features comprise a feature value representing a percentage of a neighborhood in the image whose standard deviation of stroke width is within a threshold value, wherein the stroke widths values are considered the similar if they are within the threshold value. In certain implementations, the stroke width features comprise the percentage of the rows whose standard deviation of horizontal stroke width is within a threshold, or who can be clustered into groups and standard deviation of horizontal stroke width in each group is within a threshold, or the percentage of rows who have strokes with similar stroke widths. In certain implementations, the stroke width feature comprises an average ratio of the current stroke width and the distance of the current stroke to a neighboring stroke. In certain implementations, the stroke width feature comprises a ratio of two stroke widths that appear the most frequently. In certain implementations, edge features are measurement of the smoothness of edges, uniformity of edges and amount of edges in the candidate image, wherein a smoothness of edges is represented by the percentage of neighborhoods that have the same direction, uniformity of edges is calculated as the frequency of the edge direction that appears the most often, and a number of edges is measured by the ratio of the length of the total edges to the area of the region. In certain implementations, fill factor features are extracted both in the whole candidate image and neighborhood-wise.

In certain implementations, a preprocessing process operates to determine:

(1) if region_height is smaller than some threshold T_low, or the region_height is larger than some threshold T_high, or
(2) if region_area is smaller than some threshold T_area, or
(3) if the region touches one of the four sides of the image border, and its height is larger than a threshold T, or
(4) if a fill_factor defined as $$\text{fill\_factor} = \frac{\text{Region Area}}{\text{Bounding Box Area}},$$

is lower than a threshold, then a region is considered to be a high likelihood non-text region. In certain implementations, the binarization is carried out using a plurality of binarization methods with each binarized output being processing by an optical character reader to produce multiple outputs that are combined.

Another text detection process consistent with certain implementations involves preprocessing an image by segmentation using statistical region merging, to remove regions that are definitely not text and grouping regions based on the criteria of height similarity, color similarity, region distance and horizontal alignment defined as follows:

height similarity is defined as $\frac{\max(HEIGHT_1, HEIGHT_2)}{\min(HEIGHT_1, HEIGHT_2)} < T_{height\_sim}$, where $HEIGHT_1$ and $HEIGHT_2$ are the height of the two regions;

color similarity is defined as $$D(c_1,c_2) = \sqrt{(\overline{R_1}-\overline{R_2})^2 + (\overline{G_1}-\overline{G_2})^2 + (\overline{B_1}-\overline{B_2})^2} < T_{color},$$

where $[\overline{R_1}\ \overline{G_1}\ \overline{B_1}]$ and $c_2 = [\overline{R_2}\ \overline{G_2}\ \overline{B_2}]$ are the average color of the two regions;

region distance is defined as $D_{region} < T_{region}$, where $D_{region}$ is the horizontal distance of the two regions, and horizontal alignment is defined as $D_{top}<T_{align}$ or $D_{bottom}<T_{align}$, where $D_{top}$ and $D_{bottom}$ are the vertical distances between the top boundary and bottom boundary;

carrying out a feature extraction process to describe each remaining region, where each feature is represented by a stroke feature, an edge feature and a fill factor feature of the region; and classifying the feature vector by use of a support vector machine (SVM) classifier engine which outputs whether the region is text or not using the following equation:

$$\text{sgn}\left(\sum_{i=1}^{l} y_i \alpha_i K(x_i, x) + b\right)$$

to obtain a classification output where 1 indicates the presence of text and −1 indicates the absence of text.

In certain implementations, stroke features comprise percentage of vertical neighborhood and row that have similar stroke with. In certain implementations, fill factor features are extracted both in the whole candidate image and neighborhood-wise. In certain implementations, the preprocessing operates to determine:
(1) if region_height is smaller than some threshold T_low, or the region height is larger than some threshold T_high, or
(2) if region_area is smaller than some threshold T_area, or
(3) if the region touches one of the four sides of the image border, and its height is larger than a threshold T, or
(4) if a fill_factor defined as $$\text{fill\_factor} = \frac{\text{Region Area}}{\text{Bounding Box Area}}, \quad (10)$$

is lower than a threshold, then a region is considered to be a high likelihood non-text region. In certain implementations, the binarization is carried out using a plurality of binarization methods with each binarized output being processing by an optical character reader to produce multiple outputs that are combined.

Those skilled in the art will recognize, upon consideration of the above teachings, that certain of the above exemplary embodiments are based upon use of one or more programmed processors running various software modules that can be arranged as shown in FIG. 1. However, the invention is not limited to such exemplary embodiments, since other embodiments could be implemented using hardware component equivalents such as special purpose hardware and/or dedicated processors or state machines. Similarly, general purpose computers, microprocessor based computers, microcontrollers, optical computers, analog computers, dedicated processors, application specific circuits and/or dedicated hard wired logic may be used to construct alternative equivalent embodiments.

While certain illustrative embodiments have been described, it is evident that many alternatives, modifications, permutations and variations will become apparent to those skilled in the art in light of the foregoing description.

What is claimed is:

1. A method of text detection in a video image, comprising: at an image processor, receiving a video frame that potentially contains text;

segmenting the video frame into regions having similar color;

where color similarity is defined as $$D(c_1, c_2) = \sqrt{(\overline{R_1} - \overline{R_2})^2 + (\overline{G_1} - \overline{G_2})^2 + (\overline{B_1} - \overline{B_2})^2} < T_{color},$$

where $c_1 = [\overline{R_1}\ \overline{G_1}\ \overline{B_1}]$ and $c_2 = [\overline{R_2}\ \overline{G_2}\ \overline{B_2}]$ are average colors of two regions and $T_{color}$ is a merging threshold;

identifying high likelihood non-text regions from the regions having similar color and discarding the high likelihood non-text regions;

merging regions having similar color and having horizontal positions that are within a threshold;

describing the regions using features by carrying out a feature extraction process to extract stroke features, edge features, and fill factor features; and passing the remaining regions through a trained binary classifier to obtain final text regions which are binarized for processing by OCR software.

2. The method according to claim 1, further comprising passing the binarized final text regions through an optical character reader.

3. The method according to claim 1, where the segmenting comprises:
calculating a color difference of neighboring pixels; sorting the pixels according to their color difference, and merging pixels with color difference smaller than a threshold so that regions are generated.

4. The method according to claim 1, where the binary classifier comprises a support vector machine (SVM) based classifier.

5. The method according to claim 1, where stroke width values are considered similar if the stroke widths are within a threshold value.

6. The method according to claim 1, where the stroke width features comprise a feature value representing the percentage of neighborhoods in the image whose standard deviation of stroke width is within a threshold value, or percentage of neighborhoods having similar stroke widths vertically.

7. The method according to claim 1, where the stroke width features comprise a feature value representing a percentage of rows whose standard deviation of horizontal stroke width is within a threshold, or that are clustered into groups and standard deviation of horizontal stroke width in each group is within a threshold, or the percentage of rows having similar stroke widths or clusters of similar stroke widths.

8. The method according to claim 1, where the stroke width feature comprises an average ratio of the current stroke width and a distance of the current stroke to a neighboring stroke.

9. The method according to claim 1, where the stroke width feature comprises a ratio of two stroke widths that appear the most frequently.

10. The method according to claim 1, where edge features are measurement of a smoothness of edges, uniformity of edges and amount of edges in a candidate region, where the smoothness of edges is represented by a percentage of neighborhoods that have the same direction, uniformity of edges is calculated as a frequency of an edge direction that appears most often, and an amount of edges is measured by a ratio of a length of total edges to area of the candidate region.

11. The method according to claim 1, where fill factor features are extracted both in the whole candidate image and neighborhood-wise.

12. The method according to claim 1, where regions of high likely-hood of being non-text are decided by the following:

(1) if region_height is smaller than some threshold T_low, or the region_height is larger than some threshold T_high, or
(2) if region_area is smaller than some threshold T_area, or
(3) if the region touches one of the four sides of the image border, and its height is larger than a threshold T, or
(4) if a fill_factor defined as $$\text{fill\_factor} = \frac{\text{Region Area}}{\text{Bounding Box Area}},$$

where Bounding Box Area is a non-zero number, is lower than a threshold, then a region is considered to be a high likelihood non-text region.

13. The method according to claim 1, where the binarization is carried out using a plurality of binarization methods with each binarized output being processed by an optical character reader to produce multiple outputs that are combined.

14. A text detection process, comprising:
preprocessing an image by segmentation using statistical region merging, removing regions that are definitely not text and grouping regions based on criteria of height similarity, color similarity, region distance and horizontal alignment defined as follows:
height similarity is defined as $$\frac{\max(HEIGHT_1, HEIGHT_2)}{\min(HEIGHT_1, HEIGHT_2)} < T_{height\_sim},$$

where $HEIGHT_1$ and $HEIGHT_2$ are heights of two regions and $\min(HEIGHT_1, HEIGHT_2)$ is a non-zero number;
color similarity is defined as $$D(c_1, c_2) = \sqrt{(\overline{R_1} - \overline{R_2})^2 + (\overline{G_1} - \overline{G_2})^2 + (\overline{B_1} - \overline{B_2})^2} < T_{color},$$

where $c_1 = [\overline{R_1}\, \overline{G_1}\, \overline{B_1}]$ and $c_2 = [\overline{R_2}\, \overline{G_2}\, \overline{B_2}]$ are average colors of two regions;
region distance is defined as $D_{region} < T_{region}$,
where $D_{region}$ is the horizontal distance of the two regions, and
horizontal alignment is defined as $D_{top} < T_{align}$ or $D_{bottom} < T_{align}$, where $D_{top}$ and $D_{bottom}$ are vertical distances between a top boundary and a bottom boundary;
carrying out a feature extraction process to describe each remaining region, where each feature is represented by a stroke feature, an edge feature and a fill factor feature of the region; and
classifying each feature by use of a support vector machine (SVM) classifier engine which outputs whether the region is text or not using the following equation:

$$\text{sgn}\left(\sum_{i=1}^{l} y_i \alpha_i K(x_i, x) + b\right),$$

where $(x_i, y_i)$ are feature vectors and groundtruth labels of training samples, x are feature vectors of the regions to be classified, $\alpha_i$ and b are parameters obtained by solving the optimization problem defined as $$\min_{\alpha} \frac{1}{2} \alpha^T Q \alpha - e^T \alpha$$

and subject to $y^T \alpha = 0$ ($0 \leq \alpha_i \leq C$, $i = 1, \ldots, l$), and K is defined as $$K(X, X_j) = \exp\left\{\frac{-\|X - X_j\|^2}{2\sigma^2}\right\}$$

where $2\sigma^2$ is a non-zero number to obtain a classification output where 1 indicates the presence of text and −1 indicates the absence of text.

15. The method according to claim 14, where fill factor features are extracted both in the whole candidate image and neighborhood-wise.

16. The method according to claim 14, where the preprocessing operates to remove the regions satisfying the following conditions:
(1) if region_height is smaller than some threshold T_low, or the region_height is larger than some threshold T_high, or
(2) if region_area is smaller than some threshold T_area, or
(3) if the region touches one of the four sides of the image border, and its height is larger than a threshold T, or
(4) if a fill_factor defined as $$\text{fill\_factor} = \frac{\text{Region Area}}{\text{Bounding Box Area}},$$

where Bounding Box Are is a non-zero number, is lower than a threshold,
then a region is considered to be a high likelihood non-text region and can be excluded from being further processed.

17. The method according to claim 14, where the binarization is carried out using a plurality of binarization methods with each binarized output being processing by an optical character reader to produce multiple outputs that are combined.

18. A method of text detection in a video image, comprising:
at an image processor, receiving a video frame that potentially contains text;
segmenting the video frame into regions having similar color;
identifying high likelihood non-text regions from the regions having similar color and discarding the high likelihood non-text regions;
merging regions having similar color and having horizontal positions that are within a threshold;
describing the regions using features by carrying out a feature extraction process to extract stroke features, edge features, and fill factor features;
representing the extracted features as feature vectors;
passing the remaining regions through a trained binary classifier to obtain final text regions which are binarized for processing by OCR software; and
where the trained binary classifier classifies each feature by use of a support vector machine (SVM) classifier engine which outputs whether the region is text or not using the following equation:

$$\text{sgn}\left(\sum_{i=1}^{l} y_i \alpha_i K(x_i, x) + b\right),$$

where $(x_i, y_i)$ are feature vectors and groundtruth labels of training samples, x are feature vectors of the regions to be classified, $\alpha_i$ and b are parameters obtained by solving the optimization problem defined as $$\min_\alpha \frac{1}{2}\alpha^T Q\alpha - e^T\alpha$$

and subject to $y^T\alpha = 0$ ($0 \leq \alpha_i \leq C$, $i=1, \ldots, l$), and K is defined as $$K(X, X_j) = \exp\left\{\frac{-\|X - X_j\|^2}{2\sigma^2}\right\}$$

where $2\sigma^2$ is a non-zero number to obtain a classification output where 1 indicates the presence of text and −1 indicates the absence of text.

* * * * *